US010717383B2

(12) United States Patent
Ueno et al.

(10) Patent No.: US 10,717,383 B2
(45) Date of Patent: Jul. 21, 2020

(54) VEHICLE ILLUMINATION DEVICE

(71) Applicant: NIFCO INC., Yokosuka-shi, Kanagawa (JP)

(72) Inventors: Taeko Ueno, Yokosuka (JP); Yasuhiro Watanabe, Yokosuka (JP); Hiroshi Ochiai, Yokosuka (JP); Atsushi Doi, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 0 days.

(21) Appl. No.: 16/329,566

(22) PCT Filed: Aug. 14, 2017

(86) PCT No.: PCT/JP2017/029263
§ 371 (c)(1),
(2) Date: Feb. 28, 2019

(87) PCT Pub. No.: WO2018/047582
PCT Pub. Date: Mar. 15, 2018

(65) Prior Publication Data
US 2019/0217772 A1 Jul. 18, 2019

(30) Foreign Application Priority Data

Sep. 8, 2016 (JP) ................................. 2016-175335
Jun. 28, 2017 (JP) ................................. 2017-125818

(51) Int. Cl.
*B60Q 1/50* (2006.01)
*F21V 23/04* (2006.01)
(Continued)

(52) U.S. Cl.
CPC ................ *B60Q 1/50* (2013.01); *B60K 15/05* (2013.01); *F21V 23/04* (2013.01); *G02B 6/005* (2013.01);
(Continued)

(58) Field of Classification Search
CPC ........... B60Q 1/50; B60K 15/05; F21V 23/04; G02B 6/005; F21Y 2113/00;
(Continued)

(56) References Cited

U.S. PATENT DOCUMENTS 5,751,135 A * 5/1998 Fukushima ............. B60L 53/65
320/107
5,906,406 A * 5/1999 Pajakowski ............ B60K 15/05
220/86.2
(Continued)

FOREIGN PATENT DOCUMENTS

JP 61-038236 U 3/1986
JP 2000-344011 A 12/2000
(Continued)

OTHER PUBLICATIONS

International Search Report for PCT/JP2017/029263 dated Oct. 17, 2017 [PCT/ISA/210].

*Primary Examiner* — Alexander K Garlen
*Assistant Examiner* — Christopher E Dunay
(74) *Attorney, Agent, or Firm* — Sughrue Mion, PLLC (57) ABSTRACT

To provide a vehicle illumination device that achieves good design and that appropriately emits light in a sequence of operations for charging. A vehicle illumination device 1 includes: first light emitting portions 21a and 21b disposed in the vicinity of a boundary portion 4 between a body 2 and a lid 14 via notched portions 18a and 18b formed at upper and lower edges of the lid 14; and second light emitting portions 22a and 22b disposed inside the lid 14. When the lid 14 is unlocked in operation to unlock the lid 14, the first light emitting portions 21a and 21b are turned on. When the lid 14 is depressed in operation to open the lid 14, the first light emitting portions 21a and 21b are turned off. When the lid 14 is opened, the second light emitting portions 22a and (Continued)

22b are turned on to illuminate power supply ports 11 and 12.

9 Claims, 9 Drawing Sheets

(51) Int. Cl.
    *F21V 8/00*                (2006.01)
    *B60K 15/05*             (2006.01)
    *F21Y 115/10*           (2016.01)
    *B60K 6/22*              (2007.10)
    *F21Y 113/13*           (2016.01)

(52) U.S. Cl.
    CPC ........ *B60K 6/22* (2013.01); *B60K 2015/0561* (2013.01); *B60Y 2200/91* (2013.01); *B60Y 2200/92* (2013.01); *F21Y 2113/13* (2016.08); *F21Y 2115/10* (2016.08); *Y02T 10/7005* (2013.01)

(58) Field of Classification Search
    CPC ............. F21Y 2113/10; F21Y 2113/20; B60Y 2200/91; B60Y 2200/92
    See application file for complete search history.

(56) References Cited

U.S. PATENT DOCUMENTS

| | | | |
|---|---|---|---|
| 2003/0062210 A1* | 4/2003 | Farmer | B60K 15/05 180/286 |
| 2009/0216400 A1* | 8/2009 | Larsen | B60K 15/05 701/30.7 |
| 2010/0026238 A1* | 2/2010 | Suzuki | B60Q 1/2661 320/109 |
| 2010/0246198 A1* | 9/2010 | Hook | B60Q 1/2661 362/459 |
| 2011/0043355 A1* | 2/2011 | Chander | B60K 15/05 340/455 |
| 2012/0049565 A1* | 3/2012 | Saito | B60K 15/05 296/97.22 |
| 2012/0133282 A1* | 5/2012 | Rubio | B60Q 1/50 315/77 |
| 2013/0074985 A1* | 3/2013 | Ferguson | B67D 7/348 141/98 |
| 2013/0134937 A1* | 5/2013 | Umeda | H02J 7/00 320/109 |
| 2013/0293366 A1 | 11/2013 | Suzuki et al. | |
| 2013/0326955 A1* | 12/2013 | Kotama | B60L 53/16 49/13 |
| 2014/0042966 A1* | 2/2014 | Masuda | B60L 53/22 320/109 |
| 2014/0176069 A1* | 6/2014 | Ohtomo | H02J 7/0047 320/109 |
| 2015/0048644 A1* | 2/2015 | Georgi | B60K 15/05 296/97.22 |
| 2015/0138811 A1* | 5/2015 | Salter | B60Q 1/2661 362/510 |
| 2017/0066321 A1* | 3/2017 | Szawarski | B60K 15/05 |
| 2017/0080851 A1* | 3/2017 | Matsuoka | B60Q 1/2661 |
| 2017/0210235 A1* | 7/2017 | Lopez | B60L 53/18 |
| 2017/0225615 A1* | 8/2017 | Salter | B60L 58/12 |
| 2017/0240060 A1* | 8/2017 | Roberts | B60L 11/1818 |
| 2017/0361761 A1* | 12/2017 | Salter | F21S 43/13 |
| 2018/0334052 A1* | 11/2018 | Hwang | H01R 13/70 |

FOREIGN PATENT DOCUMENTS

| | | |
|---|---|---|
| JP | 4830953 B2 | 12/2011 |
| JP | 4894611 B2 | 3/2012 |
| JP | 2013-115886 A | 6/2013 |
| JP | 2014-128042 A | 7/2014 |

* cited by examiner

VEHICLE ILLUMINATION DEVICE

CROSS REFERENCE TO RELATED APPLICATIONS

This application is a National Stage of International Application No. PCT/JP2017/029263 filed Aug. 14, 2017, claiming priority based on Japanese Patent Application Nos. 2016-175335 filed Sep. 8, 2016 and 2017-125818 filed Jun. 28, 2017.

TECHNICAL FIELD

The present invention relates to a vehicle illumination device that is used to inform a user of the position of an oil filler port, a power supply port, etc. of a vehicle.

BACKGROUND ART

There have hitherto been vehicles such as automobiles and motorcycles, for example, that include a supply receiving portion that receives supply of fuel. The supply receiving portion is covered by a lid portion, and the lid portion is opened to expose the supply receiving portion to the outside when fuel is to be supplied. In the case where fuel is to be supplied in the night or in a dark place, there may not be illumination around that allows confirmation of the position of the supply receiving portion. In particular, there may not be illumination around in the case where an electric vehicle or a hybrid vehicle is to be charged at a residence. Therefore, PTL 1 and PTL 2 mentioned below propose a vehicle in which an illumination device is provided at a supply receiving portion.

In the vehicle described in PTL 1, illumination is provided in the vicinity of a charging port, a light transmitting member is fitted at the center of an open/close lid for the charging port, and therefore light from the illumination transmits the light transmitting member to illuminate the outside of the vehicle body. The illumination is automatically turned on through wireless communication when a charging connector is in proximity to the charging port.

Also in the vehicle described in PTL 2, illumination is provided in the vicinity of a charging port. The illumination is automatically turned on through wireless communication when a remote controller for a keyless entry system, for example, is in proximity to the charging port.

CITATION LIST

Patent Literature

[PTL 1]: Japanese Patent No. 4830953
[PTL 2]: Japanese Patent No. 4894611

SUMMARY OF INVENTION

Technical Problem

However, in the vehicle described in PTL 1, as described above, the light transmitting member is fitted at the center of the open/close lid. Thus, the inside of the open/close lid is visually recognized from the outside via the light transmitting member, which is inferior in design.

In addition, in the vehicles described in PTL1 and PTL2, as described above, the illumination is automatically turned on through wireless communication when the charging connector or the remote controller is in proximity to the charging port. Thus, the illumination is not turned on in operation that does not involve wireless communication such as unlocking, opening, and closing of the open/close lid, and separate illumination is required for such cases.

The present invention has been proposed in view of the foregoing circumstances. That is, it is an object of the present invention to provide a vehicle illumination device that achieves good design and that appropriately emits light in a sequence of operations for charging.

Solution to Problem

In order to achieve the foregoing object, the present invention provides a vehicle illumination device in which a power supply portion emits light, the power supply portion being covered by a lid portion formed on an outer surface of a vehicle body, including a first light emitting portion formed in a vicinity of a boundary portion between the outer surface of the vehicle body and the lid portion to emit light along with unlocking of the lid portion.

The vehicle illumination device according to the present invention further includes a second light emitting portion provided inside the lid portion to emit light, and the first light emitting portion is turned off and the second light emitting portion is turned on by operation to open the lid portion.

In the vehicle illumination device according to the present invention, the first light emitting portion is provided via a notched portion formed at an edge of the lid portion.

In the vehicle illumination device according to the present invention, the first light emitting portion is provided with decoration that transmits light.

In the vehicle illumination device according to the present invention, the second light emitting portion is varied in color by being charged.

In the vehicle illumination device according to the present invention, the first light emitting portion is provided on the lid portion.

In the vehicle illumination device according to the present invention, the first light emitting portion is provided on a side surface of the lid portion.

The vehicle illumination device according to the present invention further includes light emitting portion switching means for switching an optical path from a light source to the first light emitting portion or the second light emitting portion.

In the vehicle illumination device according to the present invention, a color of the first light emitting portion or the second light emitting portion is selected in conjunction with detection means for detecting opening and closing of the lid portion.

Advantageous Effects of Invention

The vehicle illumination device according to the present invention is configured as described above. That is, the first light emitting portion is formed in the vicinity of the boundary portion. Therefore, the first light emitting portion is compatible with the boundary portion in terms of appearance, which achieves good design compared to a case where the first light emitting portion is formed away from the boundary portion on the outer surface of the lid portion or the outer surface of the vehicle body. In addition, since the first light emitting portion emits light with unlocking of the lid portion which is the first operation performed for charging, the user can be appropriately informed of the position of the power supply portion.

The vehicle illumination device according to the present invention further includes a second light emitting portion provided inside the lid portion to emit light, and the first light emitting portion is turned off and the second light emitting portion is turned on by operation to open the lid portion. That is, in a sequence of operations for charging, the first light emitting portion is turned off after the user is informed of the position of the power supply portion, and the second light emitting portion emits light for the user, who has confirmed the position of the power supply portion, to confirm the inside of the power supply portion in the next operation. Thus, only a portion that requires illumination for operation by the user can be caused to emit light at an appropriate timing. Therefore, light is not emitted unnecessarily, which suppresses power consumption.

In the vehicle illumination device according to the present invention, the first light emitting portion is provided via a notched portion formed at an edge of the lid portion. That is, the lid portion which is independent of the vehicle body is processed so as to conform to the first light emitting portion. Therefore, there is no need to process the vehicle body so as to conform to the first light emitting portion, which facilitates design of the vehicle body.

In the vehicle illumination device according to the present invention, the first light emitting portion is provided with decoration that transmits light. This configuration transmits light when light is emitted, and provides a plated or woodgrain appearance, the same color tone as the vehicle body, or the like, for example, when light is turned off, which achieves good design.

In the vehicle illumination device according to the present invention, the second light emitting portion is varied in color by being charged. Thus, the user can be informed of the state of operation in a distinguishable manner in a sequence of operations for charging. For example, the user can be visually informed of the state of operation using different color hues for each supply speed or progress of charging such as completion of supply.

In the vehicle illumination device according to the present invention, the first light emitting portion is provided on the lid portion. That is, the first light emitting portion is formed on the lid portion in the vicinity of the boundary portion. Therefore, the first light emitting portion is compatible with the boundary portion in terms of appearance, which achieves good design compared to a case where the first light emitting portion is formed away from the boundary portion on the outer surface of the lid portion or the outer surface of the vehicle body.

In the vehicle illumination device according to the present invention, the first light emitting portion is provided on a side surface of the lid portion. With this configuration, the outer surface of the lid portion is flush with the outer surface of the vehicle body when the lid portion is closed. Therefore, the side surface of the lid portion is not exposed to the outer surface of the vehicle body in the vicinity of the boundary portion. That is, the first light emitting portion is shielded when the lid portion is closed, which achieves good design. When the first light emitting portion is turned on in this state, diffused light leaks through the boundary portion, which informs the user of the position of the lid portion.

The vehicle illumination device according to the present invention further includes light emitting portion switching means for switching an optical path from a light source to the first light emitting portion or the second light emitting portion. That is, one of the light emitting portions can be caused to emit light using a single light source by switching the optical path.

In the vehicle illumination device according to the present invention, wherein a color of the first light emitting portion or the second light emitting portion is selected in conjunction with detection means for detecting opening and closing of the lid portion. That is, it is possible to emit light in only the desired color and turn off light in unwanted colors along with opening and closing of the lid portion.

BRIEF DESCRIPTION OF DRAWINGS

FIG. 6 illustrates FIGS. 6(a) and 6(b) illustrate a vehicle illumination device according to a second embodiment of the present invention, in which

FIG. 8 illustrates FIGS. 8(a) and 8(b) illustrate the essential portion of the vehicle illumination device according to the second embodiment of the present invention, in which

FIG. 9 illustrates FIGS. 9(a) and 9(b) illustrate the essential portion of the vehicle illumination device according to the second embodiment of the present invention as enlarged, in which

FIG. 10 illustrates FIGS. 10(a), 10(b), and 10(c) illustrate the inside of a lid portion for the power supply portion on which the vehicle illumination device according to the second embodiment of the present invention is mounted, in which

DESCRIPTION OF EMBODIMENTS

Figure 1:
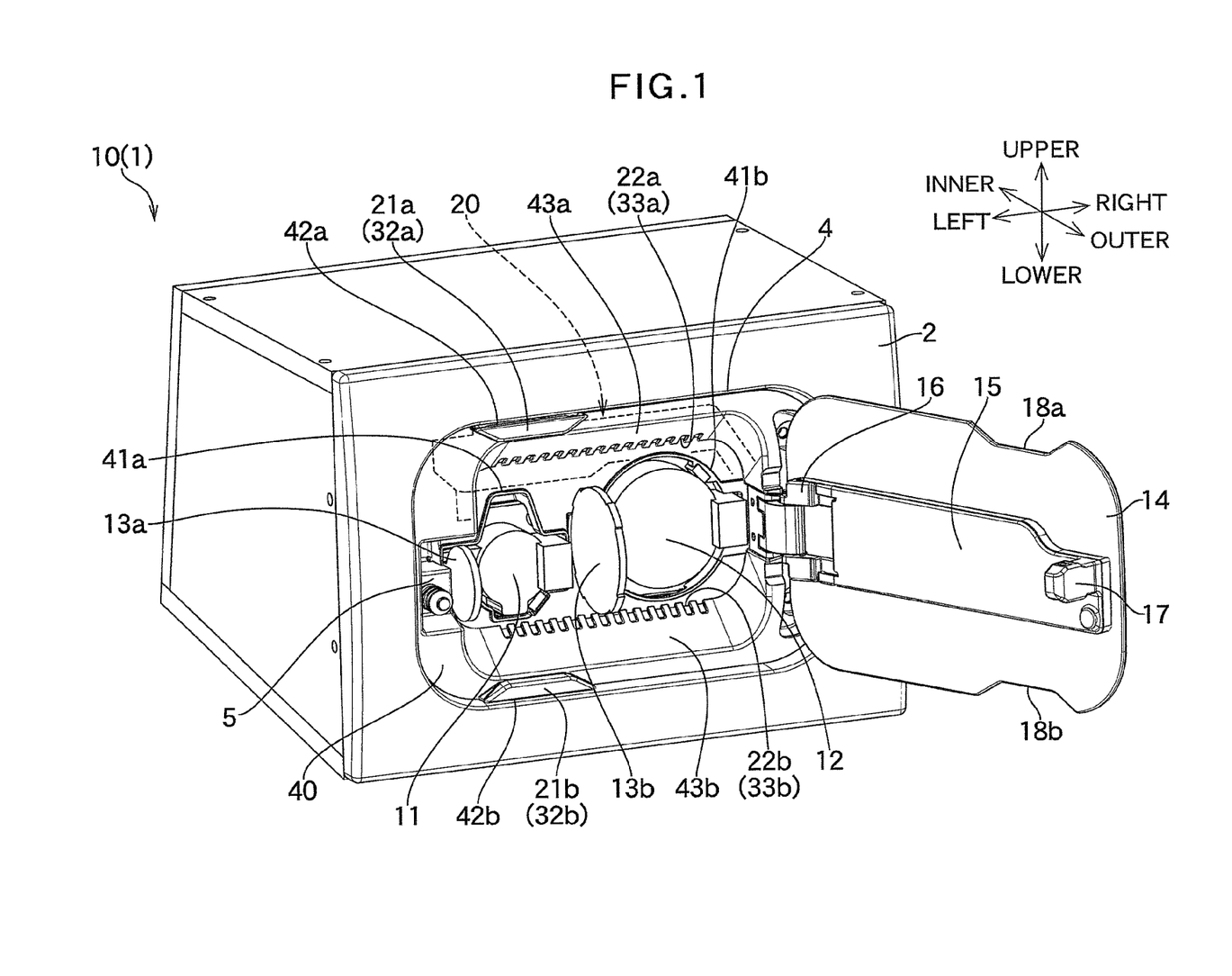
FIG. 1 is an appearance perspective view illustrating the appearance of a power supply portion on which a vehicle illumination device according to a first embodiment of the present invention is mounted.
Figure 2:
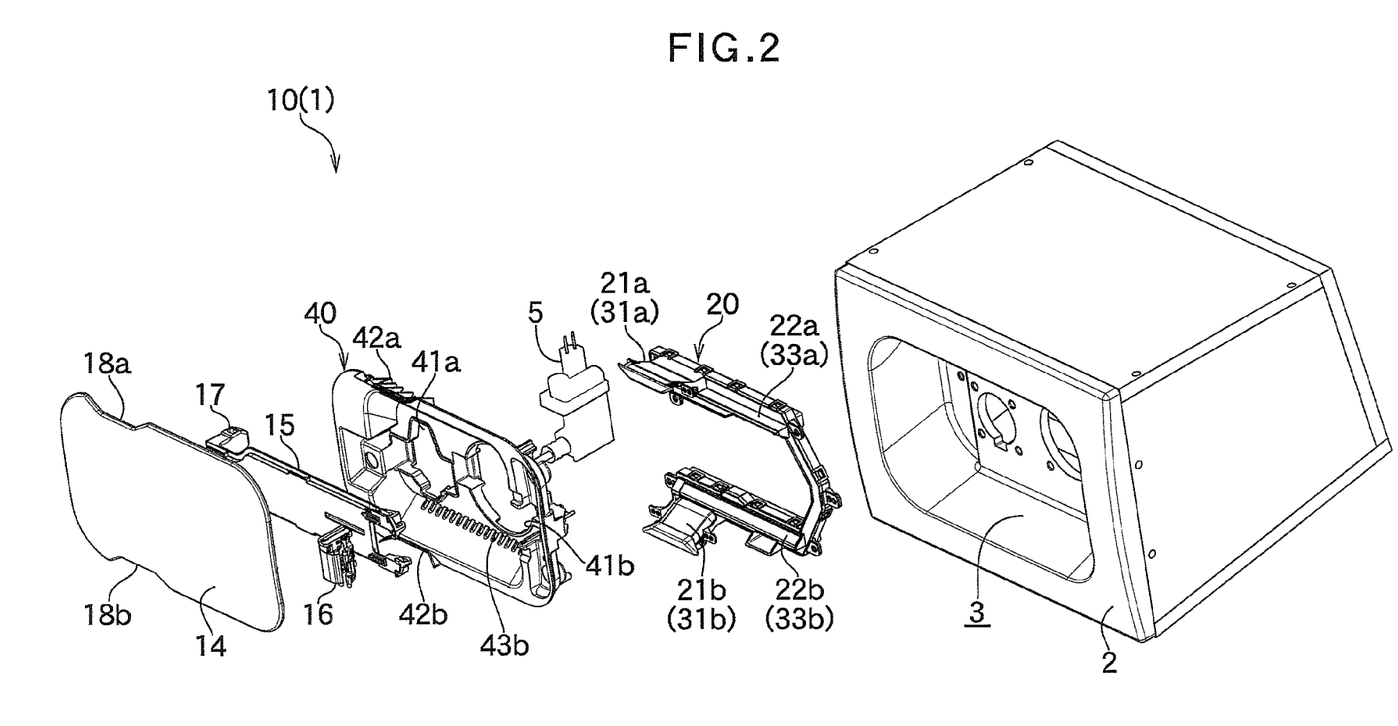
FIG. 2 is an exploded perspective view of the power supply portion on which the vehicle illumination device according to the first embodiment of the present invention is mounted.
Figure 3:
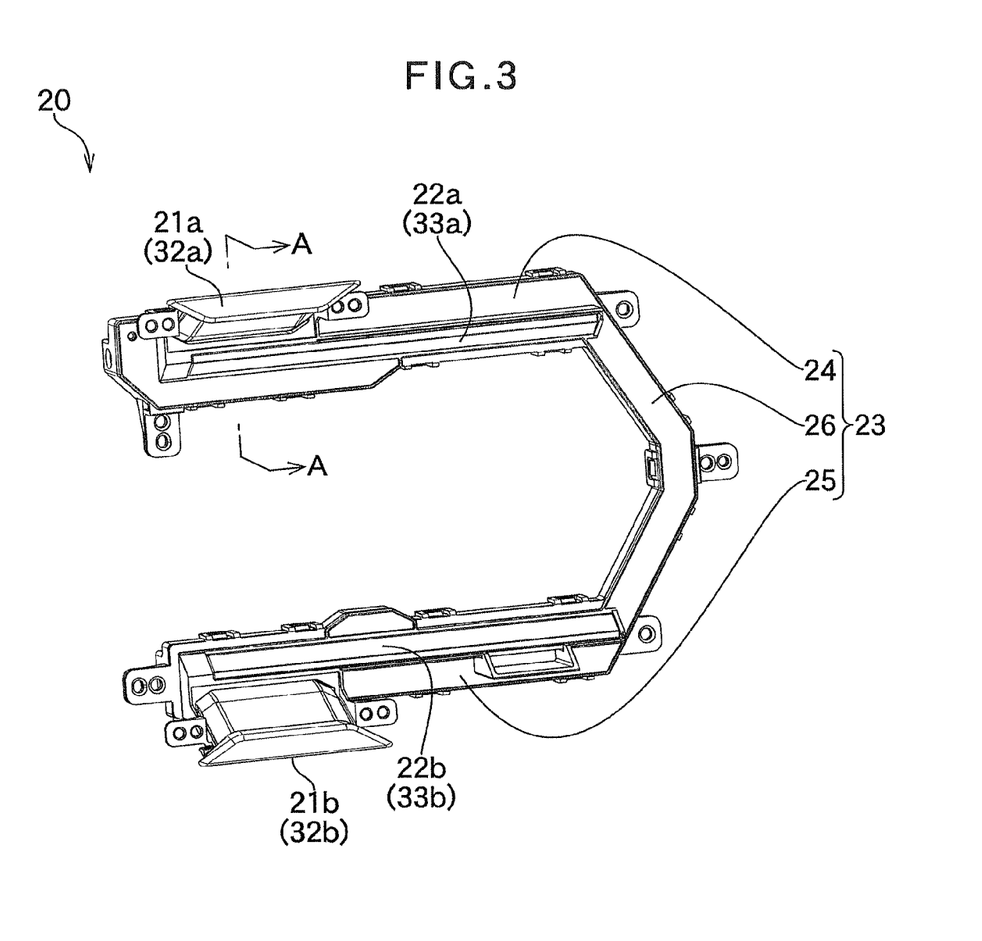
FIG. 3 is an enlarged perspective view of an essential portion of the vehicle illumination device according to the first embodiment of the present invention.

A vehicle illumination device according to a first embodiment of the present invention will be described below with reference to the drawings. FIG. 1 illustrates a power supply portion 10 on which a vehicle illumination device 1 according to the first embodiment is mounted, illustrating a state in which a lid 14 that serves as a lid portion is opened. FIG. 2 illustrates the power supply portion 10 on which the vehicle illumination device 1 is mounted as exploded. FIG. 3 illustrates an illumination unit 20 which is an essential portion for implementing the vehicle illumination device 1. In FIGS. 1 and 2, the vehicle illumination device 1 is formed on the front surface of a box-like housing. In actual products, however, the vehicle illumination device 1 is formed at a power supply portion for charging on the outer surface of the vehicle body of a vehicle (not illustrated) such as an automobile or a motorcycle. Thus, in the drawings, the front surface of the housing is considered as a body 2 that serves as the outer surface of the vehicle body. In the following description, as illustrated in FIG. 1, the side of the outer surface of the body 2 is defined as the outer side, the side of the inner surface of the body 2 is defined as the inner side, the direction of the vehicle height with the vehicle illumination device 1 considered as being mounted on an automobile is defined as the upper side and the lower side, and the direction of the overall length of the automobile is defined as the left side and the right side.

The vehicle illumination device 1 is provided in the vicinity of the power supply portion 10 for charging a plug-in hybrid vehicle, an electric vehicle, or the like that serves as the vehicle, and is turned on or flashed on and off. As illustrated in FIGS. 1 and 2, the power supply portion 10 includes a recessed portion 3 formed by cutting out a part of the body 2 in a substantially rectangular shape and recessed inward, and two power supply ports 11 and 12 attached to the recessed portion 3. The vehicle illumination device 1 is mainly implemented by an illumination unit 20. The illumination unit 20 is attached around the power supply ports 11 and 12. The outer periphery of the power supply ports 11 and 12 and the illumination unit 20 is covered by a housing 40. A lid 14 is attached to the housing 40. The lid 14 closes the recessed portion 3 to cover the power supply ports 11 and 12.

One of the power supply ports 11 and 12 is a normal power supply port 11 for normal charging, and the other is a fast power supply port 12 for fast charging. Sensors (not illustrated) are provided around terminals (not illustrated) of the power supply ports 11 and 12. Covers 13a and 13b are provided to cover the sensors and the terminals. The sensors detect connection of a charging connector (not illustrated) to each of the charging ports 11 and 12. Examples of the sensors include those of a contact type such as micro switches, and those of a non-contact type such as magnetic and infrared sensors.

As illustrated in FIGS. 1 and 3, the illumination unit 20 is composed of: first light emitting portions 21a and 21b disposed around the power supply ports 11 and 12 in the vicinity of a boundary portion 4 between the body 2 and the lid 14; second light emitting portions 22a and 22b disposed around the power supply ports 11 and 12 inside the power supply portion 10; a control section (not illustrated) that controls the light emitting portions 21a, 21b, 22a, and 22b; and a frame body portion 23 that supports the light emitting portions 21a, 21b, 22a, and 22b.

The frame body portion 23 is composed of: an upper frame portion 24 that extends in the right-left direction; a lower frame portion 25 disposed substantially in parallel with the upper frame portion 24 to extend in the right-left direction; and a connecting frame portion 26 that connects between the respective right ends of the upper and lower frame portions 24 and 25. The first light emitting portions 21a and 21b, which project outward, are formed close to the respective left ends on the outside surfaces of the upper and lower frame portions 24 and 25. In addition, the second light emitting portions 22a and 22b, which extend in the right-left direction, are formed on the respective outside surfaces of the upper and lower frame portions 24 and 25. That is, with the upper and lower frame portions 24 and 25 disposed above and below the power supply ports 11 and 12, the first light emitting portions 21a and 21b are also disposed above and below the power supply ports 11 and 12, and disposed outside the lid 14. In addition, the second light emitting portions 22a and 22b are also disposed above and below the power supply ports 11 and 12, and disposed inside the lid 14.

Figure 4:
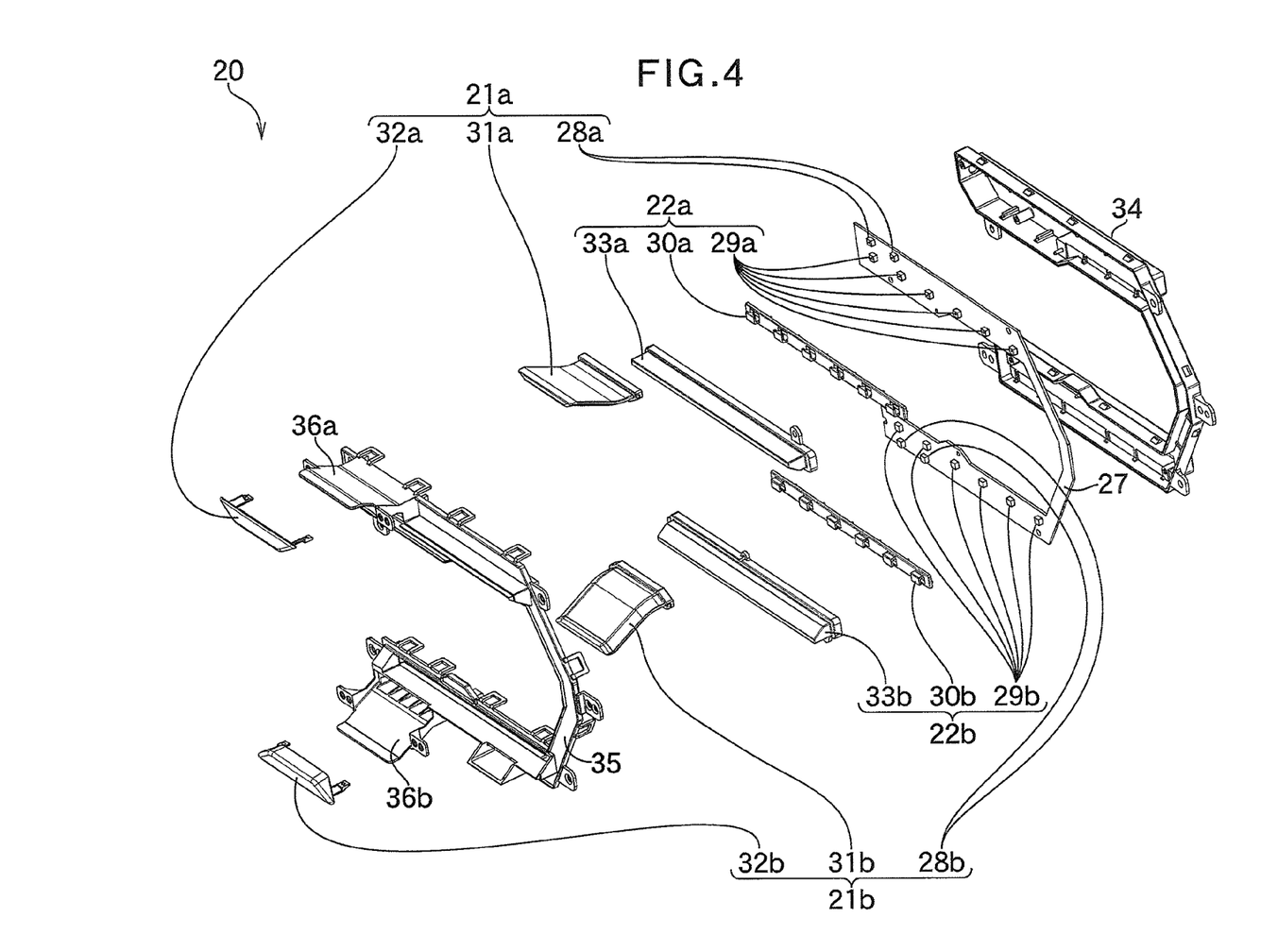
FIG. 4 is an exploded perspective view of the essential portion of the vehicle illumination device according to the first embodiment of the present invention.
Figure 5:
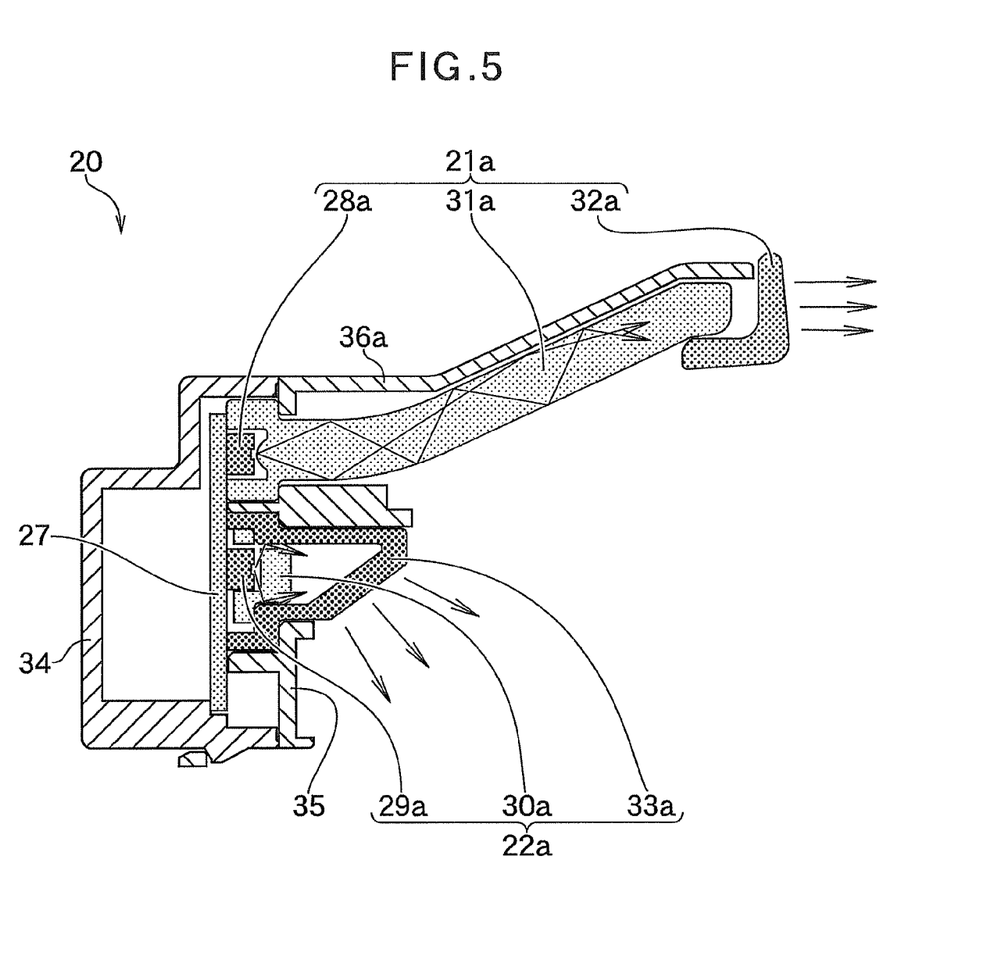
FIG. 5 is an enlarged A-A sectional view of the essential portion of the vehicle illumination device according to the first embodiment of the present invention.

The illumination unit 20 will be described in further detail with reference to the drawings. FIG. 4 illustrates the illumination unit 20 as exploded. FIG. 5 illustrates an enlarged section of the illumination unit 20 taken along the line A-A in FIG. 3.

As illustrated in FIGS. 4 and 5, the illumination unit 20 is composed of: LEDs that serve as a light source; an LED substrate 27 to which the LEDs are attached; reflection plates 30a and 30b and light guide bodies 31a and 31b attached to the LED substrate 27 to cover the LEDs; second lenses 33a and 33b that serve as a light transmitting member that covers the reflection plates 30a and 30b; first lenses 32a and 32b that serve as a light transmitting member attached to the light guide bodies 31a and 31b; and an inner case 34 and an outer case 35 that house the LED substrate 27 therebetween.

The plurality of LEDs which are attached to the LED substrate 27 are disposed in correspondence with the light emitting portions 21a, 21b, 22a, and 22b. To be more specific, the LEDs are composed of first light source LEDs 28a and 28b that serve as a light source for the first light emitting portions 21a and 21b, and second light source LEDs 29a and 29b that serve as a light source for the second light emitting portions 22a and 22b. The first light source LEDs 28a and 28b are disposed close to the left end on the outside surface in correspondence with the size of the first light emitting portions 21a and 21b. On the other hand, the second light source LEDs 29a and 29b are arranged side by side in the right-left direction on the outside surface in correspondence with the size of the second light emitting portions 22a and 22b. The colors of the LEDs 28a, 28b, 29a, and 29b may be determined as desired, and may be a combination of white, red, yellow, blue, green. etc. The light sources may be incandescent lamps or fluorescent lamps as long as they are bright enough to achieve an environment that is easily visually recognizable for the user. However, the LEDs are preferable from the viewpoint of the directivity of light, heat radiation, and the ease of size reduction.

The light guide bodies 31a and 31b are shaped to bulge outward from the LED substrate 27, and totally reflect light from the first light source LEDs 28a and 28b internally and radiate the light from the respective distal ends thereof on the outer side. The first lenses 32a and 32b, which are attached to the respective distal ends of the light guide bodies 31a and 31b, are provided with decoration that transmits light. When the first light emitting portions 21a and 21b emit light, the first lenses 32a and 32b transmit the light. The color of the first lenses 32a and 32b may be determined as desired, and may be milky-white, for example. The decoration may provide a plated or woodgrain appearance, may have the same color tone as the vehicle body, or the like.

The reflection plates 30a and 30b cover the individual second light source LEDs 29a and 29b, and totally reflect light from the second light source LEDs 29a and 29b to be radiated from the second lenses 33a and 33b. The second lenses 33a and 33b cover the second light source LEDs 29a and 29b which are arranged side by side, and are formed to have a length corresponding to the upper and lower frame portions 24 and 25 of the illumination unit 20. The color of the second lenses 33a and 33b may be determined as desired, and may be milky-white, for example.

The inner case 34 and the outer case 35 are formed in a shape corresponding to the illumination unit 20. The outer case 35 is formed with support pieces 36a and 36b, to which the light guide bodies 31a and 31b and the first lenses 32a and 32b of the first light emitting portions 21a and 21b are attached, in the upper and lower frame portions 24 and 25 of the illumination unit 20. The support pieces 36a and 36b are shaped to bulge outward in correspondence with the light guide bodies 31a and 31b.

In the illumination unit 20 configured as described above, the first light emitting portions 21a and 21b are constituted from the first light source LEDs 28a and 28b, the light guide bodies 31a and 31b, and the first lenses 32a and 32b, and the second light emitting portions 22a and 22b are constituted from the second light source LEDs 29a and 29b, the reflection plates 30a and 30b, and the second lenses 33a and 33b. The lid 14 and the housing 40 are configured in accordance with the configuration of the light emitting portions 21 and 22 as follows.

As illustrated in FIGS. 1 and 2, the lid 14 has a plate shape, is sized to cover the power supply ports 11 and 12 of the power supply portion 10, and is disposed flush with the body 2 to cover the power supply ports 11 and 12. The lid 14 is structured to open and close the power supply portion 10 via a lid inner 15. The lid 14 opens and closes from the left end side with the right end of the lid inner 15 serving as a hinge 16 and with an engagement portion 17 formed at the left end side of the lid inner 15. The engagement portion 17 projects inward, and engages with an actuator 5 that controls locking and unlocking of the lid 14. The actuator 5 is attached close to the left side on the outer side of the power supply portion 10, at a position facing the engagement portion 17. The actuator 5 is provided, as appropriate, with a sensor (not illustrated) that detects engagement and disengagement of the engagement portion 17 and locking and unlocking of the lid 14.

The lid 14 is further formed with notched portions 18a and 18b close to the left side at the upper end edge and the lower end edge. Specifically, the notched portions 18a and 18b are disposed in the vicinity of the engagement portion 17 and the actuator 5 with respect to the position of the hinge 16. When the lid 14 is closed, a clearance is formed at the boundary portion 4 between the body 2 and the lid 14 via the notched portions 18a and 18b. The first light emitting portions 21a and 21b are attached to the notched portions 18a and 18b at the boundary portion 4.

The housing 40 is formed in a substantially rectangular shape, and recessed inward at the center in accordance with the recessed portion 3. Opening portions 41a and 41b, in which the power supply ports 11 and 12 are disposed, are formed at the center of the housing 40. Second arrangement portions 43a and 43b, at which the second light emitting portions 22a and 22b are disposed, are formed on the upper side and the lower side around the opening portions 41a and 41b. The second arrangement portions 43a and 43b are a plurality of holes arranged side by side in the right-left direction above and below the opening portions 41a and 41b. The second lenses 33a and 33b of the second light emitting portions 22a and 22b are disposed inside the holes.

The housing 40 is formed with first arrangement portions 42a and 42b, at which the first light emitting portions 21a and 21b are disposed, close to the left side at the upper end edge and the lower end edge. The first arrangement portions 42a and 42b are formed at positions corresponding to the notched portions 18a and 18b of the lid 14. Specifically, as with the notched portions 18a and 18b, the first arrangement portions 42a and 42b are disposed in the vicinity of the engagement portion 17 and the actuator 5 with respect to the position of the hinge 16 of the lid 14. The light guide bodies 31a and 31b and the first lenses 32a and 32b of the first light emitting portions 21a and 21b are disposed at the first arrangement portions 42a and 42b.

The vehicle illumination device 1 is configured as described above. Next, the state of turn-on and turn-off of the vehicle illumination device 1 in a sequence of operations for charging will be described together with control for locking and unlocking of the lid 14. Charging includes a locked state, unlocking operation, an unlocked state, opening operation, an open state, a power supply state, a fully charged state, and closing operation. The lid 14 is unlocked by a remote operation executed by a remote controller (not illustrated) for a keyless entry system. The lid 14 may be unlocked by operating a lever in the vehicle.

In the locked state, there is no need to charge, and therefore the power supply ports 11 and 12 are closed with the lid 14 closed, and the lid 14 is locked by the actuator 5. In the locked state, the first light emitting portions 21a and 21b and the second light emitting portions 22a and 22b are turned off. When unlocking operation is executed in the locked state, an unlocked state is established.

Unlocking operation is performed when the remote controller is operated. When a wireless signal from the remote controller is received, the lid 14 is unlocked by the actuator 5 to establish an unlocked state.

In the unlocked state, the first light emitting portions 21a and 21b are turned on, and the first lenses 32a and 32b transmit light to inform the user of the position of the power supply portion 10. The color of the first light emitting portions 21a and 21b may be determined as desired, and may be white, for example. When opening operation is executed in the unlocked state, an open state is established.

Opening operation is performed when the lid 14 is pushed by the user. Specifically, when the left side of the outer surface of the lid 14 in the vicinity of the first light emitting portions 21a and 21b is pushed by the user, the lid 14 is depressed inward, and then is opened outward to expose the power supply ports 11 and 12, which establishes an open state. In the opening operation, when the lid 14 is depressed, the first light emitting portions 21a and 21b are turned off to save power. When the lid 14 is opened, the second light emitting portions 22a and 22b are turned on to illuminate the power supply ports 11 and 12, which informs the user of the positions of the power supply ports 11 and 12. The color of the second light emitting portions 22a and 22b may be determined as desired, and may be white, for example.

In the open state, in which the vehicle stands by for power supply, the second light emitting portions 22a and 22b are kept turned on. In the open state, when a charging connector is connected to the power supply ports 11 and 12 to start charging, a power supply state is established.

In the power supply state, the second light emitting portions 22a and 22b are flashed on and off with their color varied to inform the user that the vehicle is being charged. The power supply ports 11 and 12 include the normal power supply port 11 and the fast power supply port 12. Therefore, the color which is used when the charging connector is connected to the normal power supply port 11 and the color which is used when the charging connector is connected to the fast power supply port 12 are different from each other. The color of the second light emitting portions 22a and 22b may be determined as desired. For example, the color of the second light emitting portions 22a and 22b is varied from white to yellow and the second light emitting portions 22a and 22b are flashed on and off in yellow in the case where the charging connector is connected to the normal power supply port 11, and the color of the second light emitting portions 22a and 22b is varied from white to red and the second light emitting portions 22a and 22b are flashed on and off in red in the case where the charging connector is connected to the fast power supply port 12. When charging is completed in the charging state, a fully charged state is established.

In the fully charged state, the second light emitting portions 22a and 22b are flashed on and off with their color varied to inform the user that charging has been completed. The color of the second light emitting portions 22a and 22b may be determined as desired. For example, the color of the second light emitting portions 22a and 22b is varied from the color which is used in the power supply state to green and the second light emitting portions 22a and 22b are flashed on and off in green. When closing operation is executed in the fully charged state, the locked state is recovered.

Closing operation is performed when the lid 14 is closed and depressed inward by the user. When the lid 14 is depressed and the second light emitting portions 22a and 22b are turned off, the user is informed that a sequence of operations for charging has been completed.

Selection as to whether to turn on, or flash on and off, the light emitting portions 21a, 21b, 22a, and 22b may be made as desired.

The vehicle illumination device 1 operates as described above. Next, the effect of the vehicle illumination device 1 will be described.

In the vehicle illumination device 1, as described above, the lid 14 is formed with the notched portions 18a and 18b close to the left side at the upper end edge and the lower end edge. The first light emitting portions 21a and 21b are attached in the vicinity of the boundary portion 4 between the body 2 and the lid 14 via the notched portions 18a and 18b. That is, since the first light emitting portions 21a and 21b are formed in the vicinity of the boundary portion 4, the first light emitting portions 21a and 21b are compatible with the boundary portion 4 in terms of appearance, which achieves good design. In addition, since the first light emitting portions 21a and 21b are turned on with unlocking operation for the lid 14 which is the first operation performed for charging, the user can be appropriately informed of the position of the power supply portion 10.

Since the lid 14 is formed with the notched portions 18a and 18b, in addition, the lid 14 which is independent of the body 2 is processed so as to conform to the first light emitting portions 21a and 21b. Therefore, there is no need to process the body 2 so as to conform to the first light emitting portions 21a and 21b, which facilitates design of the body 2.

In addition, the notched portions 18a and 18b of the lid 14 are disposed in the vicinity of the engagement portion 17 and the actuator 5 with respect to the position of the hinge 16, and the first light emitting portions 21a and 21b are disposed at positions corresponding to the notched portions 18a and 18b. That is, the first light emitting portions 21a and 21b are turned on in the vicinity of the position to be pushed by the user in the opening operation. Therefore, the user can be guided to the position to be pushed by informing the user of the position to be pushed, which prompts the user to the opening operation.

The vehicle illumination device 1 is provided with the second light emitting portions 22a and 22b which are disposed around the power supply ports 11 and 12 inside the power supply portion 10, and which are turned on or flashed on and off inside the lid 14. In the opening operation for the lid 14, the first light emitting portions 21a and 21b are turned off when the lid 14 is depressed, and the second light emitting portions 22a and 22b are turned on to illuminate the power supply ports 11 and 12 when the lid 14 is opened. That is, in a sequence of operations for charging, the first light emitting portions 21a and 21b are turned off after the user is informed of the position of the power supply portion 10, and the second light emitting portions 22a and 22b are turned on for the user, who has confirmed the position of the power supply portion 10, to confirm the position of the power supply ports 11 and 12 in the next operation. Thus, only portions that require illumination for operation by the user can be turned on at appropriate timings. Therefore, the light emitting portions are not turned on unnecessarily, which suppresses power consumption.

In the vehicle illumination device 1, the first lenses 32a and 32b of the first light emitting portion 21a and 21b are provided with decoration that transmits light. This decoration provides a plated or woodgrain appearance, the same color tone as the vehicle body, or the like, for example, when the first light emitting portions 21a and 21b are turned off, which achieves good design. Since the first lenses 32a and 32b transmit light when the first light emitting portions 21a and 21b emit light, on the other hand, the user can be appropriately informed of the position of the power supply portion 10.

In the vehicle illumination device 1, the second light emitting portions 22a and 22b are flashed on and off with their color varied in the power supply state. Thus, the user can be informed of the power supply state and the fully charged state in a distinguishable manner in a sequence of operations for charging. For example, in the power supply state, the color of the second light emitting portions 22a and 22b is varied from white to yellow and the second light emitting portions 22a and 22b are flashed on and off in yellow in the case where the charging connector is connected to the normal power supply port 11, and the color of the second light emitting portions 22a and 22b is varied from white to red and the second light emitting portions 22a and 22b are flashed on and off in red in the case where the charging connector is connected to the fast power supply port 12. In the fully charged state, meanwhile, the color of the second light emitting portions 22a and 22b is varied from the color which is used in the power supply state to green and the second light emitting portions 22a and 22b are flashed on and off in green. That is, the user can be visually informed of the state of operation using different color hues for each type or progress of charging.

In an embodiment that is different from the first embodiment described above, the notched portions may be formed on the body at the boundary portion as long as the first light emitting portions are compatible with the boundary portion in terms of appearance. However, the notched portions are preferably formed on the lid, since forming the notched portions on the lid which is independent of the body facilitates design of the body.

In a different embodiment, the first light emitting portions may be provided in the vicinity of the boundary portion or on the lid as long as the first light emitting portions are compatible with the boundary portion in terms of appearance. In the case where the first light emitting portions are provided on the lid, however, it is necessary to mount the LED substrate, wires, etc. on the lid. Therefore, the first light emitting portions are preferably provided on the body integrally with the second light emitting portions in the illumination unit.

In a different embodiment, the second light emitting portions may be disposed on the right and left of the opening portions or over the entire periphery of the opening portions as long as the openings are illuminated to be easily visually recognizable by the user. However, the second light emitting portions are preferably arranged side by side in the right-left direction on the upper side and the lower side of the opening portions in consideration of the relationship of arrangement of the hinge for opening and closing of the lid and the actuator which controls locking and unlocking of the lid.

Figure 6A:
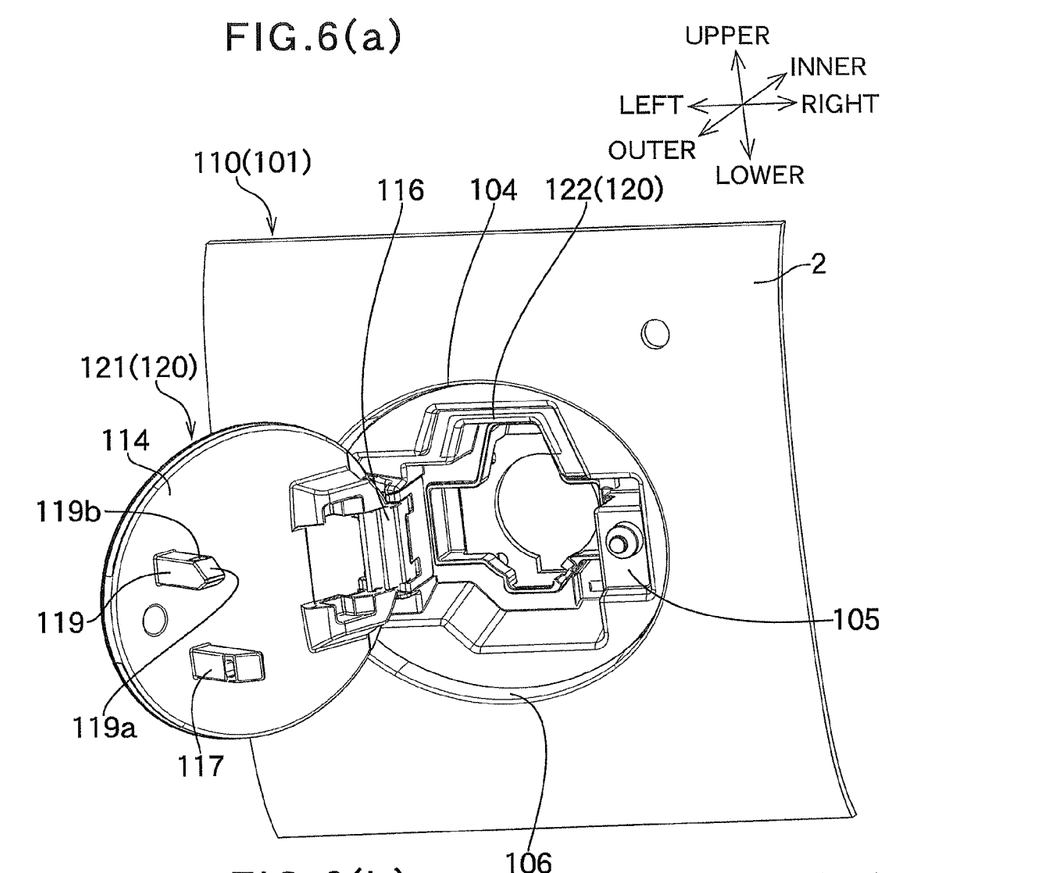
FIG. 6(a) is an appearance perspective view illustrating the appearance of a power supply portion on which the vehicle illumination device is mounted and FIG. 6(b) is a perspective view illustrating the appearance and a part of the interior of the power supply portion on which the vehicle illumination device is mounted.
Figure 6B:
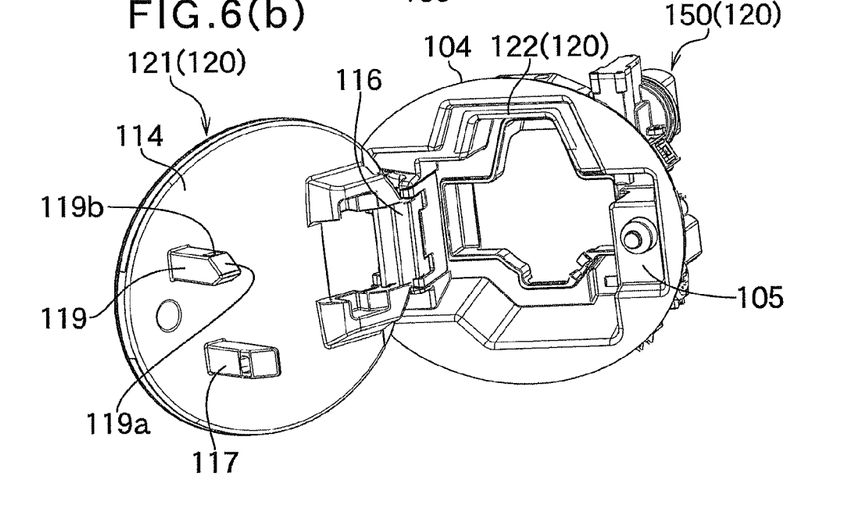

Next, a vehicle illumination device according to a second embodiment of the present invention will be described with reference to the drawings. FIGS. 6(a) and 6(b) illustrate a state in which a lid 114 is opened in a power supply portion 110 on which a vehicle illumination device 101 according to the second embodiment is mounted. In the following description, components that are different from those according to the first embodiment will be mainly described, and similar components will not be described as appropriate.

In the second embodiment, unlike the first embodiment, the lid 114 is provided with a first light emitting portion 121, and the lid 114 emits light without the need to mount an LED substrate, wires, etc. on the lid 114.

As illustrated in FIGS. 6(a) and 6(b), the power supply portion 110 is formed by cutting out a part of the body 2 in a substantially circular shape, and a circular edge groove portion 106 is formed in the body 2 at a boundary portion 104. The lid 114 has a circular plate shape, and opens and closes from the right end side with the left end of the lid 114 serving as a hinge 116 and with an engagement portion 117 and a light passage portion 119 formed at the right end side. The engagement portion 117 projects inward, and engages with an actuator 105 that controls locking and unlocking of the lid 114. The actuator 105 is attached close to the right side on the outer side of the power supply portion 110, at a position facing the engagement portion 117. The light passage portion 119 has a hollow bar shape, and projects inward. An inclined surface portion 119a is formed at the distal end of the light passage portion 119. A light receiving window portion 119b is formed in the upper surface of the light passage portion 119.

An illumination unit 120 is composed of: a first light emitting portion 121 attached to a peripheral side surface of the lid 114 in the vicinity of the boundary portion 104; a second light emitting portion 122 disposed above the power supply port inside the power supply portion 110; and a light source unit 150 disposed above the actuator 105. That is, in the illumination unit 120, the first light emitting portion 121 is attached to the side of the lid 114, and the second light emitting portion 122 and the light source unit 150 are attached to the side of the power supply port.

Figure 7:
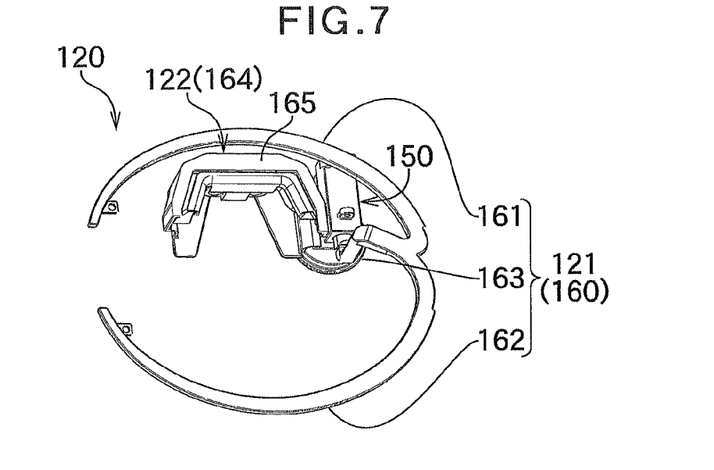
FIG. 7 is a perspective view of an essential portion of the vehicle illumination device according to the second embodiment of the present invention.
Figures 8A, 8B:
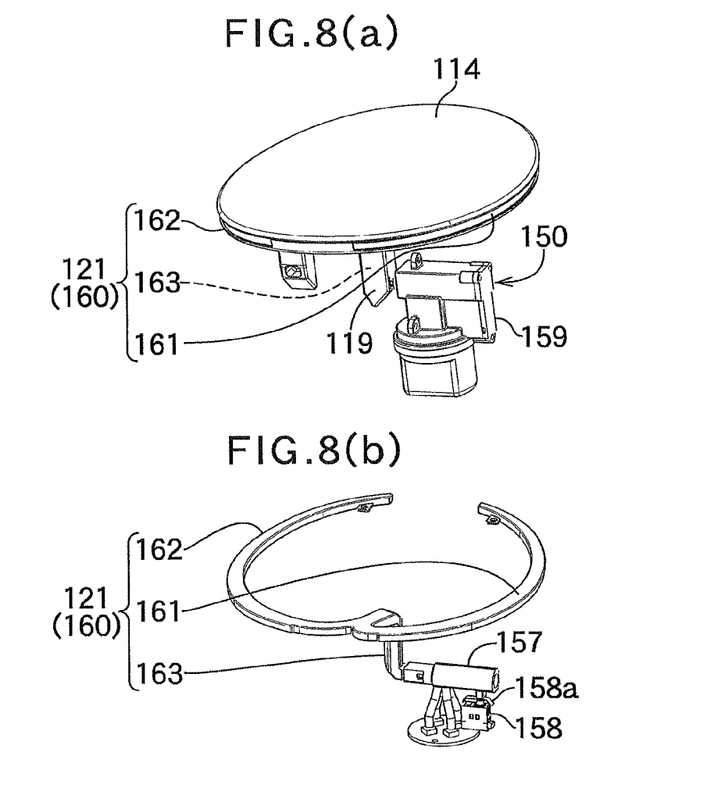
FIG. 8(a) is an appearance perspective view and FIG. 8(b) is an interior perspective view.
Figure 9A:
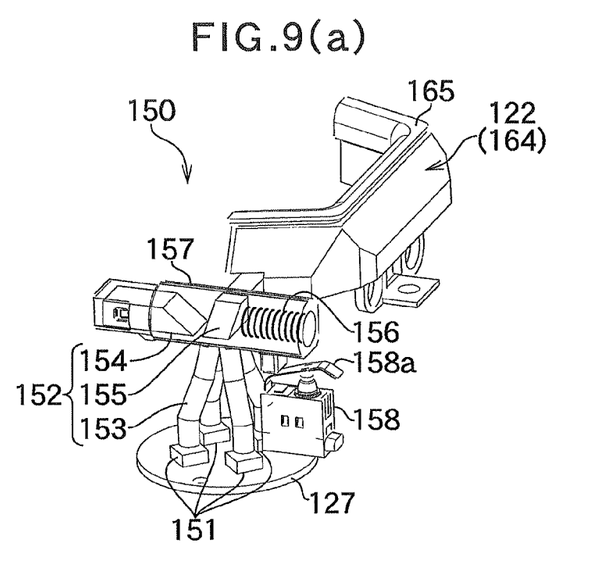
FIG. 9(a) is a perspective view illustrating a state in which a second light emitting portion is selected as an optical path and FIG. 9(b) is a perspective view illustrating a state in which a first light emitting portion is selected as the optical path.
Figure 9B:
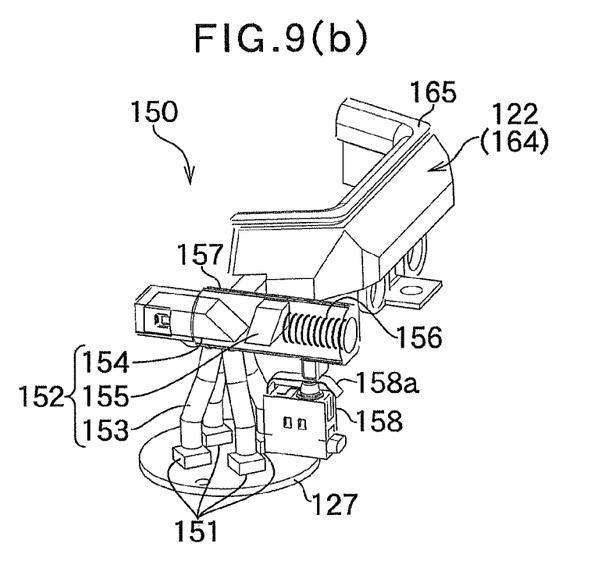

The illumination unit 120 will be described with reference to the drawings. FIG. 7 illustrates the illumination unit 120 as seen obliquely from below. FIGS. 8(a) and 8(b) illustrate a part of the illumination unit 120 as seen from the right side. FIGS. 9(a) and 9(b) illustrate a part of the illumination unit 120, as enlarged, as seen from the right side.

As illustrated in FIGS. 7, 8(a) and 8(b), a first light guide body 160 of the first light emitting portion 121 has a substantially annular shape along the peripheral side surface of the lid 114, and is composed of: a first curved light guide portion 161 curved arcuately upward; a second curved light guide portion 162 curved arcuately upward; and a projecting light guide portion 163 to which the respective right ends of the curved light guide portions 161 and 162 are connected and which projects inward. The curved light guide portions 161 and 162 are disposed on the peripheral side surface of the lid 114, exposed on the peripheral side surface, and not visually recognizable from the outside. The projecting light guide portion 163 is disposed inside the light passage portion 119 of the lid 114, and exposed from the light receiving window portion 119b. As illustrated in FIGS. 7, 9(a), and 9(b), on the other hand, a second light guide body 164 of the second light emitting portion 122 is shaped to bulge outward, and a lens 165 is attached to the distal end of the second light emitting portion 164.

As illustrated in FIGS. 8(a), 8(b), 9(a), and 9(b), the light source unit 150 is composed of: an LED substrate 127 in a circular plate shape to which a plurality of LEDs 151 are attached; an intermediate light guide body 152 disposed between the LEDs 151 and the light guide bodies 160 and 164; a light guide direction changeover switch 157 that serves as light emitting portion switching means for switching an optical path from the LEDs 151 to the first light emitting portion 121 or the second light emitting portion 122; and an open/close detection switch 158 that serves as detection means for detecting opening and closing of the lid 114. Such members are covered by a unit case 159. The color of the LEDs 151 may be determined as desired.

The intermediate light guide body 152 is composed of: a base light guide portion 153 attached to each of the LEDs 151; and a first light emitting portion-side light guide portion 154 and a second light emitting portion-side light guide portion 155 disposed at the distal end of the base light guide portion 153 and built in the light guide direction changeover switch 157. The light guide direction changeover switch 157 is substantially tubular. The first light emitting portion-side light guide portion 154 is disposed at the lower end side (left side in FIGS. 9(a) and 9(b)) of the light guide direction changeover switch 157. The second light emitting portion-side light guide portion 155 is disposed at substantially the middle of the light guide direction changeover switch 157. A coil spring 156 is disposed at the upper end side (right side in FIGS. 9(a) and 9(b)) of the light guide direction changeover switch 157. The open/close detection switch 158 is a micro switch of a so-called contact type, and has a lever 158a disposed at a position facing the inner side of the upper end side of the light guide direction changeover switch 157.

With this configuration, as illustrated in FIG. 9(a), when an external force is not applied to the light guide direction changeover switch 157, the second light emitting portion-side light guide portion 155 is disposed at a position facing the distal end of the base light guide portion 153, and the second light emitting portion-side light guide portion 155 is selected as the optical path for the LEDs 151. In this state, the open/close detection switch 158 is not actuated. On the other hand, when an external force is applied from the lower end side of the light guide direction changeover switch 157, as illustrated in FIG. 9(b), the first light emitting portion-side light guide portion 154 is disposed at a position facing the distal end of the base light guide portion 153, and the first light emitting portion-side light guide portion 154 is selected as the optical path for the LEDs 151. In this state, the open/close detection switch 158 is actuated with the lever 158a pushed.

Figure 10A:
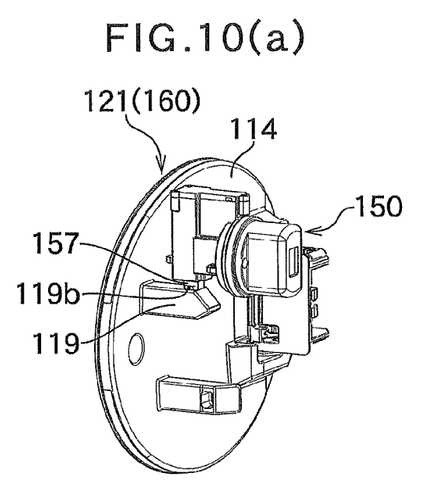
FIGS. 10(a) and 10(c) are each a perspective view illustrating a state in which the lid portion is closed and FIG. 10(b) is a perspective view illustrating a state in which the lid portion is opened.
Figure 10B:
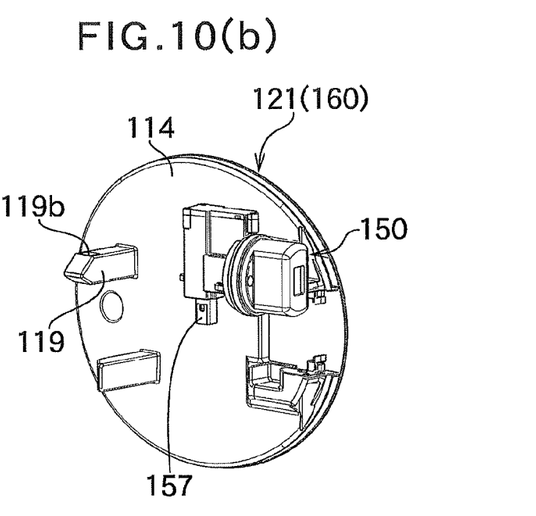
Figure 10C:
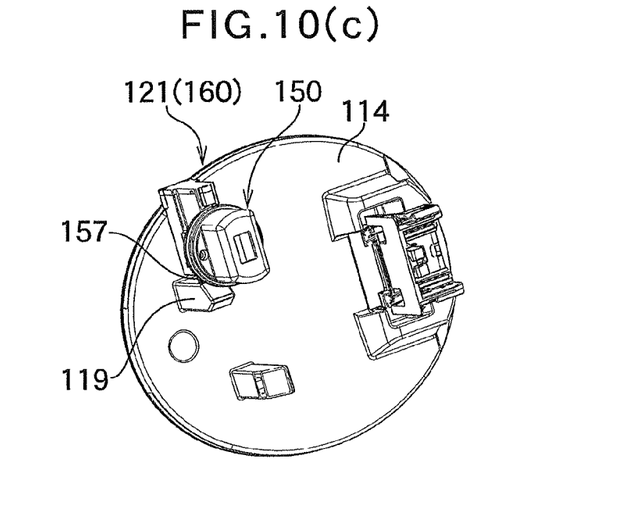

The vehicle illumination device 101 is configured as described above. Next, operation of the illumination unit 120 during opening and closing of the lid 114 for charging will be described with reference to the drawings. FIGS. 10(a), 10(b), and 10(c) illustrate operation of the light source unit 150 during opening and closing the lid 114 as seen from the inner side of the lid 114, in which FIGS. 10(a) and 10(c) illustrate a state in which the lid 114 is closed and FIG. 10(b) illustrates a state in which the lid 114 is opened. The state of turn-on and turn-off of the vehicle illumination device 101 in a sequence of operations for charging is the same as that according to the first embodiment, and will not be described as appropriate.

In the locked state, as illustrated in FIGS. 10(a) and 10(c), the lid 114 is closed. Therefore, the first light guide body 160 on the peripheral side surface of the lid 114 faces the edge groove portion 106 to be shielded. In addition, the light guide direction changeover switch 157 of the light source unit 150 is pushed by the light passage portion 119 of the lid 114. To be more specific, in this state, the light guide direction changeover switch 157 faces the light receiving window portion 119b of the light passage portion 119, and the first light emitting portion-side light guide portion 154 is selected as the optical path for the LEDs 151 (see FIG. 9(b)). Therefore, the optical path extends from the LEDs 151, passes through the base light guide portion 153 and the first light emitting portion-side light guide portion 154 of the intermediate light guide body 152, and reaches the projecting light guide portion 163 and the curved light guide portions 161 and 162 of the first light guide body 160 via the light receiving window portion 119b (see FIGS. 8(a) and 8(b)). Meanwhile, it is detected that the lid 114 is closed with the open/close detection switch 158 pushed.

When an unlocked state is established by unlocking operation, the first light emitting portion 121 is turned on to inform the user of the position of the power supply portion 110. In that event, the color of the first light emitting portion 121 is selected in conjunction with the open/close detection switch 158. That is, since it is detected that the lid 114 is closed, some of the LEDs 151 are selected in accordance with the color in which the first light emitting portion 121 is to emit light, only the LEDs 151 which are set in advance emit light, and the other LEDs 151 are kept turned off.

In an open state established through opening operation, when the user pushes the lid 114 to open the lid 114, as illustrated in FIG. 10(b), the light guide direction changeover switch 157 of the light source unit 150 is released from the light passage portion 119 of the lid 114. To be more specific, in this state, in the light guide direction changeover switch 157, the second light emitting portion-side light guide portion 155 is selected as the optical path for the LEDs 151 (see FIG. 9(a)). Therefore, the optical path extends from the LEDs 151, passes through the base light guide portion 153 and the second light emitting portion-side light guide portion 155 of the intermediate light guide body 152, and reaches the second light guide body 164. Meanwhile, it is detected that the lid 114 is opened with the open/close detection switch 158 released.

In the open state, the first light emitting portion 121 is turned off, and the second light emitting portion 122 is turned on to illuminate the power supply port to inform the user of the position of the power supply port. In that event, the color of the second light emitting portion 122 is selected in conjunction with the open/close detection switch 158. That is, since it is detected that the lid 114 is opened, some of the LEDs 151 are selected in accordance with the color in which the second light emitting portion 122 is to emit light, only the LEDs 151 which are set in advance emit light, and the other LEDs 151 are kept turned off.

The vehicle illumination device 101 operates as described above. Next, the effect of the vehicle illumination device 101 will be described.

As described above, with the vehicle illumination device 101, as illustrated in FIGS. 6(a), 6(b), and 7, the lid 114 has the light passage portion 119 which projects inward, and the light receiving window portion 119b is formed in the upper surface of the light passage portion 119. In addition, the first light guide body 160 of the first light emitting portion 121 is composed of: the curved light guide portions 161 and 162 which are curved arcuately along the peripheral side surface of the lid 114; and the projecting light guide portion 163 to which the respective right ends of the curved light guide portions 161 and 162 are connected and which projects inward. The curved light guide portions 161 and 162 are disposed on the peripheral side surface of the lid 114, exposed on the peripheral side surface, and not visually recognizable from the outside. The projecting light guide portion 163 is disposed inside the light passage portion 119 of the lid 114, and exposed from the light receiving window portion 119b.

That is, the first light emitting portion 121 is attached to the peripheral side surface of the lid 114. Therefore, the first light emitting portion 121 is compatible with the boundary portion 104 in terms of appearance, which achieves good design compared to a case where the first light emitting portion 121 is formed away from the boundary portion 104 on the outer surface of the lid 114 or the outer surface of the body 2. In the locked state in which the lid 114 is closed, in particular, the first light guide body 160 on the peripheral side surface of the lid 114 faces the edge groove portion 106 to be shielded, and the outer surface of the lid 114 is flush with the outer surface of the body 2. Therefore, the first light emitting portion 121 is not exposed to the outer surface of the body 2 in the vicinity of the boundary portion 104. Thus, good design can be achieved. When the first light emitting portion 121 is turned on in this state, diffused light leaks to the outside through the boundary portion 104, which allows informing the user of the position of the lid 114.

With the vehicle illumination device 101, the light source unit 150 is provided with: the intermediate light guide body 152 which is disposed between the LEDs 151 and the light guide bodies 160 and 164; and the light guide direction changeover switch 157 which switches the optical path from the LEDs 151 to the first light emitting portion 121 or the second light emitting portion 122. The intermediate light guide body 152 is composed of: the base light guide portion 153 which is attached to each of the LEDs 151; and the first light emitting portion-side light guide portion 154 and the second light emitting portion-side light guide portion 155 which are disposed at the distal end of the base light guide portion 153 and built in the light guide direction changeover switch 157.

With this configuration, in the open state (see FIG. 9(a)) in which an external force is not applied to the light guide direction changeover switch 157, the second light emitting portion-side light guide portion 155 is selected as the optical path for the LEDs 151, and the optical path extends from the LEDs 151, passes through the base light guide portion 153 and the second light emitting portion-side light guide portion 155 of the intermediate light guide body 152, and reaches the second light guide body 164. On the other hand, in the locked state (see FIG. 9(b)) in which an external force is applied to the lower end side of the light guide direction changeover switch 157 by the light passage portion 119, the first light emitting portion-side light guide portion 154 is selected as the optical path for the LEDs 151, and the optical path extends from the LEDs 151, passes through the base light guide portion 153 and the first light emitting portion-side light guide portion 154 of the intermediate light guide body 152, and reaches the projecting light guide portion 163 and the curved light guide portions 161 and 162 of the first light guide body 160 via the light receiving window portion 119b. In this manner, one of the light emitting portions 121 and 122 can be caused to emit light using a single light source by switching the optical path for the LEDs 151.

With the vehicle illumination device 101, the light source unit 150 is provided with the open/close detection switch 158 which detects opening and closing of the lid 114, and the lever 158a is disposed at a position facing the inner side of the upper end side of the light guide direction changeover switch 157. With this configuration, in the open state (see FIG. 9(a)), it is detected that the lid 114 is opened with the open/close detection switch 158 not actuated. Therefore, some of the LEDs 151 are selected in accordance with the color in which the second light emitting portion 122 is to emit light, only the LEDs 151 which are set in advance emit light, and the other LEDs 151 are kept turned off. Meanwhile, in the locked state (see FIG. 9(b)), it is detected that the lid 114 is closed with the open/close detection switch 158 pushed. Therefore, some of the LEDs 151 are selected in accordance with the color in which the first light emitting portion 121 is to emit light, only the LEDs 151 which are set in advance emit light, and the other LEDs 151 are kept turned off. In this manner, it is possible to emit light only the desired color and turn off light in unwanted colors along with opening and closing of the lid 114.

In an embodiment that is different from the second embodiment described above, the first light emitting portion may be attached to the outer surface along the peripheral edge of the lid at the boundary portion. In this case, the first light guide body may be provided with decoration that transmits light.

Although the embodiments of the present invention have been discussed in detailed above, the present invention is not limited to the embodiments described above. A variety of design changes can be made to the present invention without departing from the matter defined in the claims. The embodiments described above are mounted on a power supply portion provided to an electric vehicle or a motorcycle. However, such embodiments may be mounted on a power supply portion for trains, ships, airplanes, etc., for example. The embodiments may also be mounted on vehicles that operate on fuel such as gasoline or diesel oil.

REFERENCE SIGNS LIST 1, 101 VEHICLE ILLUMINATION DEVICE
2 BODY (OUTER SURFACE OF VEHICLE BODY)
3 RECESSED PORTION
4, 104 BOUNDARY PORTION
5, 105 ACTUATOR
10, 110 POWER SUPPLY PORTION
11 NORMAL POWER SUPPLY PORT
12 FAST POWER SUPPLY PORT
13a, 13b COVER
14, 114 LID (LID PORTION)
15 LID INNER
16, 116 HINGE
17, 117 ENGAGEMENT PORTION
18a, 18b NOTCHED PORTION
20, 120 ILLUMINATION UNIT
21a, 21b, 121 FIRST LIGHT EMITTING PORTION
22a, 22b, 122 SECOND LIGHT EMITTING PORTION
23 FRAME BODY PORTION
24 UPPER FRAME PORTION
25 LOWER FRAME PORTION
26 CONNECTING FRAME PORTION
27, 127 LED SUBSTRATE
28a, 28b FIRST LIGHT SOURCE LED
29a, 29b SECOND LIGHT SOURCE LED
30a, 30b REFLECTION PLATE
31a, 31b LIGHT GUIDE BODY
32a, 32b FIRST LENS
33a, 33b SECOND LENS
34 INNER CASE
35 OUTER CASE
36a, 36b SUPPORT PIECE
40 HOUSING
41a, 41b OPENING PORTION
42a, 42b FIRST ARRANGEMENT PORTION
43a, 43b SECOND ARRANGEMENT PORTION
106 EDGE GROOVE PORTION
119 LIGHT PASSAGE PORTION
119a INCLINED SURFACE PORTION
119b LIGHT RECEIVING WINDOW PORTION
150 LIGHT SOURCE UNIT
151 LED
152 INTERMEDIATE LIGHT GUIDE BODY
153 BASE LIGHT GUIDE PORTION
154 FIRST LIGHT EMITTING PORTION-SIDE LIGHT GUIDE PORTION
155 SECOND LIGHT EMITTING PORTION-SIDE LIGHT GUIDE PORTION
156 COIL SPRING
157 LIGHT GUIDE DIRECTION CHANGEOVER SWITCH (LIGHT EMITTING PORTION SWITCHING MEANS)
158 OPEN/CLOSE DETECTION SWITCH (DETECTION MEANS)
158a LEVER
159 UNIT CASE
160 FIRST LIGHT GUIDE BODY
161 FIRST CURVED LIGHT GUIDE PORTION
162 SECOND CURVED LIGHT GUIDE PORTION
163 PROJECTING LIGHT GUIDE PORTION
164 SECOND LIGHT GUIDE BODY
165 LENS

The invention claimed is:

1. A vehicle illumination device in which a power supply portion emits light, the power supply portion being covered by a lid portion formed on an outer surface of a vehicle body, comprising:
    a first light emitting portion formed in a vicinity of a boundary portion between the outer surface of the vehicle body and the lid portion to emit light along with unlocking of the lid portion, and
    a second light emitting portion provided inside the lid portion to emit light,
    wherein the first light emitting portion is turned off and the second light emitting portion is turned on by operation to open the lid portion.

2. The vehicle illumination device according to claim 1, wherein the first light emitting portion is provided via a notched portion formed at an edge of the lid portion.

3. The vehicle illumination device according to claim 2, wherein the first light emitting portion is provided with decoration that transmits light.

4. The vehicle illumination device according to claim 1, wherein the first light emitting portion is provided with decoration that transmits light.

5. The vehicle illumination device according to claim 1, wherein the second light emitting portion is varied in color by being charged.

6. The vehicle illumination device according to claim 1, wherein the first light emitting portion is provided on the lid portion.

7. The vehicle illumination device according to claim 6, wherein the first light emitting portion is provided on a side surface of the lid portion.

8. The vehicle illumination device according to claim 1, further comprising:
   light emitting portion switching means for switching an optical path from a light source to the first light emitting portion or the second light emitting portion.

9. The vehicle illumination device according to claim 1, wherein a color of the first light emitting portion or the second light emitting portion is selected in conjunction with detection means for detecting opening and closing of the lid portion.

* * * * *